2,996,542
PHOSPHORUS-NITROGEN COMPOUNDS

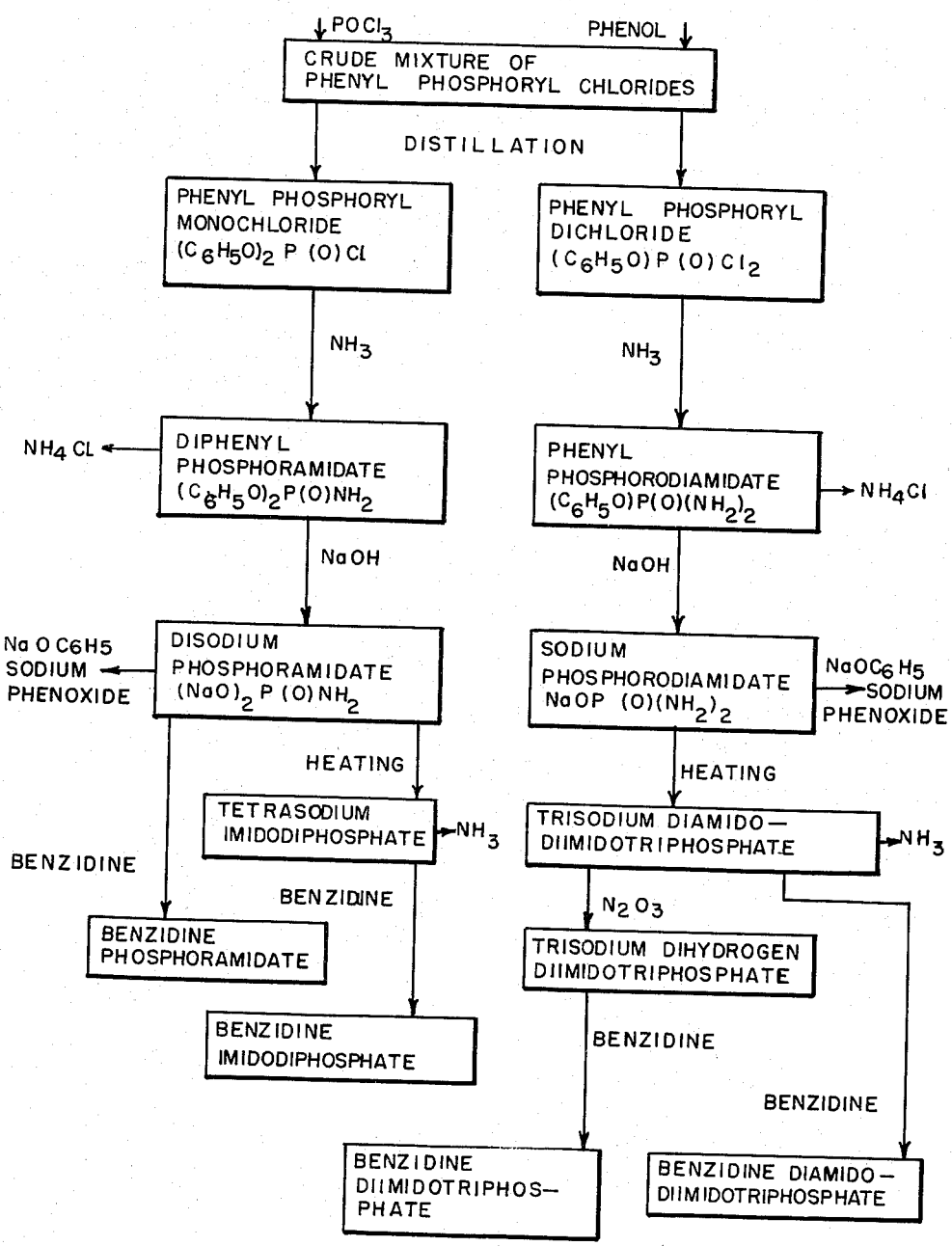

Morris L. Nielsen, Dayton, Ohio, assignor to Monsanto Chemical Company, St. Louis, Mo., a corporation of Delaware
Filed Oct. 28, 1957, Ser. No. 692,703
7 Claims. (Cl. 260—551)

The present invention relates to new compositions of matter containing phosphorus and nitrogen. The invention relates particularly to new types of phosphorus-nitrogen compounds and their salts including phosphoramidates, imidodiphosphates, diimidotriphosphates, and diamido diimidotriphosphates.

It is an object of the invention to prepare new salts of phosphoramidic acid, $HOP(O)(NH_2)_2$, imidodiphosphoric acid, $(HO)_2P(O)NH—P(O)(OH)_2$, and diimidotriphosphoric acid $$(HO)_2P(O)NH—P(O)(OH)NH—P(O)(OH)_2$$

which are of utility as emulsifying agents and antioxidants. It is also an object of the invention to prepare rust inhibitors containing amine salts of phosphoramidic acid, imidodiphosphoric acid, diimidotriphosphoric acid, and diamido diimidotriphosphoric acid.

Salts of phosphoramidic acid, imidodiphosphoric acid, diimidotriphosphoric acid and diamido diimidotriphosphoric acid are prepared by the following method which is shown in diagrammatic form in the drawing which forms a part of the present specification.

Phosphoryl chloride, $POCl_3$, is mixed with phenol and then heated to a temperature of from 100° C. to 200° C. The intermediate product thus obtained is a mixture of phenyl phosphoryl mono- and dichloride, which is distilled to yield the individual compounds. On treating the phenyl phosphoryl monochloride separately with gaseous ammonia, preferably in an inert solvent such as hexane or toluene, the corresponding mono-amide, diphenyl phosphoramidate is formed. This compound is separated from the co-formed ammonium chloride, as by extraction with cold water, and serves as the intermediate for the next step. In preparing disodium phosphoramidate, diphenyl phosphoramidate is reacted at the boiling point with sufficient sodium hydroxide, preferably supplied as a solution, for saponification. The desired sodium salt is isolated by crystallization from water-alcohol mixtures. From this sodium salt it is easily possible to prepare the amine salts such as the benzidine salt by metathesis of the disodium phosphoramidate with benzidine acetate. This yields benzidine phosphoramidate.

The drawing also shows that tetrasodium imidodiphosphate may be prepared by heating disodium phosphoramidate to a temperature of 100° C. to 300° C. This results in the evolution of ammonia to yield tetrasodium imidodiphosphate. A preferred method of operation is to carry out the reaction in the absence of air, preferably under reduced pressure. The tetrasodium salt is readily soluble in water. The benzidine salt is then prepared by metathesis of tetrasodium imidodiphosphate with benzidine acetate, thus forming benzidine imidodiphosphate.

The drawing of the present invention also shows the method of preparation of diimidotriphosphate salts and diamido diimidotriphosphate. The starting material in this case is phenyl phosphoryl dichloride which is reacted with ammonia to yield phenyl phosphorodiamidate with the formation of ammonium chloride. Reaction of this phenyl phosphorodiamidate with sodium hydroxide gives a salt, sodium phosphorodiamidate with the formation of sodium phenoxide as a by-product.

Heating the sodium phosphorodiamidate to a temperature of from 100° C. to 300° C. results in the evolution of some ammonia and the production of trisodium diamido diimidotriphosphate. This intermediate is then treated with nitrogen sesquioxide, $N_2O_3$, to obtain trisodium dihydrogen diimidotriphosphate. The benzidine salt is obtained by metathesis of this sodium salt with benzidine acetate thus yielding benzidine diimidotriphosphate.

The preferred group of salts which in general are contemplated in the present invention are the amine salts selected from the class consisting of compounds having the formula:

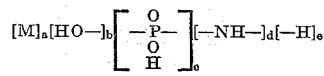

wherein M is an amine component or moiety, $a$ is a number selected from the group consisting of 0.5, 1, 1.5, 2, 2.5, 3, 4, and 5; $b$ is a number selected from the group consisting of 0, 1, and 2; $c$ is a number selected from the group consisting of 1, 2, and 3; $d$ is a number selected from the group consisting of 1, 2, 3, and 4; and $e$ is a number selected from the group consisting of 0, 1, and 2.

The above formula includes the amine salts of phosphoramidic acid such as o-tolidine phosphoramidate, the amine salts of imidodiphosphoric acid such as benzidine imidodiphosphate and the amine salts of diimidotriphosphoric acid such as benzidine diimidotriphosphate.

As shown in the drawing the class of amine salts of phosphoramidic, imidodiphosphoric and diimidotriphosphoric acids are prepared by direct stoichiometric neutralization of the said acids with the amine, or metathesis of the salts such as by the use of a solution of o-tolidine which may be mixed with an acid in order to more readily solublize the base. The amines which may be employed include ethylenediamine; m-phenylenediamine; p-phenylenediamine, naphthidene; β-naphthylamine and 4,4'-diaminotolane. A preferred group of amines are the benzidines, such as benzidine, o-tolidine, o-dianisidine, monoalkylbenzidines and dialkylbenzidines. A group of compounds embraced within the present invention can therefore be represented by the formula of an amine salt, [X][Y], where X is an amine moiety selected from the class consisting of ethylenediamine, m-phenylenediamine, p-phenylenediamine, naphthidene, β-naphthylamine, 4,4'-diaminotolane, benzidine, o-tolidine, o-dianisidine, monoalkylbenzidine and dialkylbenzidine, and Y is a moiety selected from the class consisting of phosphoramidic acid, imidodiphosphoric acid and diimidotriphosphoric acid. The relative proportions of the two moieties is in accordance with the conventional stoichiometric relationships.

The amine salts of phosphoramidic, imidodiphosphoric and diimidotriphosphoric acids are generally insoluble in water but are soluble in molten acetamide, formamide and urea. The reaction which the salts have in water upon prolonged contact is one of substantial neutrality. These amine salts may readily be employed as emulsifying agents, for example, in polymerizing unsaturated monomers. Another use as antioxidants, for example, in rubber, lubricating oils, and in antifreeze compositions. The amine salts may also be employed as biocides, for example, as a component of a ship bottom paint in order to prevent the growth of barnacles. The amine salts also have utility as indicators in a test for free halogen, for example, chlorine, which causes the amine salt to turn blue.

Another use for the present amine salts is as a catalyst for the condensation of urea-formaldehyde and melamine-formaldehyde resins. In this relationship the salts upon being heated evolve some ammonia to leave an acidic catalyst.

Another field of utility for the amine salt of phosphoramidic, imidodiphosphoric and diimidotriphosphoric acid is as a corrosion inhibitor for steel and other ferrous metals. For this purpose, the said amine salts may be employed in a water- or oil-based paint which is applied to the steel or iron surfaces. However, the amine salts may also be employed as inhibitors in aqueous solutions or suspension in an aqueous system, for example, as a minor component in a cooling water system which may be circulated through the cast iron jacket of an internal combustion engine to cool the engine. The hot water from the engine is then cooled in a heat exchanger or other type of cooling tower in which the water is subjected to an aeration treatment. In this relationship, the amine salt also serves to reduce bacteria and algae growth in the system.

The following examples illustrate specific embodiments of the present invention.

*Example 1*

Phenyl phosphoryl chloride was prepared by reacting one mol of phosphoryl chloride with one and one half moles of phenol. The phosphoryl chloride was charged to a flask provided with a reflux condenser and the phenol was slowly added. The charge was brought to a temperature of 100–125° C. and heating continued at reflux for 24 hours. The mixture thus obtained consisted largely of phenyl phosphoryl dichloride B.P. 140° C./14 mm. and phenyl phosphoryl monochloride B.P. 195° C./13 mm. which were separated by fractional distillation.

The phenyl phosphoryl monochloride was reacted with ammonia in Skellysolve F, at 25° C. The solids were recovered and treated with hot chloroform which dissolved the desired product, phenyl phosphoramidate, leaving ammonium chloride. On evaporating the chloroform solution, crystals of diphenyl phosphoramidate M.P. 149° C. were obtained.

The phenyl phosphoryl dichloride was dissolved in hexane and similarly reacted with an excess of gaseous ammonia at 25° C. The solids were removed by filtration and were dried free of hexane. The co-formed ammonium chloride was removed by extraction with water, leaving the crystalline product, phenyl phosphorodiamidate, $(C_6H_5O)P(O)(NH_2)_2$ M.P. 185° C.

*Example 2*

Disodium phosphoramidate was prepared from diphenyl phosphoramidate by treating 25 grams thereof with 16 grams of sodium hydroxide dissolved in 60 ml. water and gently boiling for a period of 10 minutes. The reaction mixture was cooled to about 5° C. and 200 ml. of ethanol added. The solid product consisting of crude disodium phosphoramidate $(NaO)_2P(O)NH_2$ in the form of a hydrate was filtered off and washed with alcohol and ether.

*Example 3*

The benzidine salt of phosphoramidic acid was prepared by metathesis. To a solution of 1.84 g. benzidine in 122 ml. water and 61 ml. glacial acetic acid was added a solution of 2.49 g. disodium phosphoramidate hexahydrate in 700 ml. water. On adding 1 liter of ethanol and chilling, the product crystallized as square platelets. The solids were washed with alcohol and ether, and weighed 1.65 g. Analysis showed the compound to be $(C_{12}H_{12}N_2)(H_2O_2 \cdot PONH_2)_2$ having the elementary analysis of 14.45% N (14.81% calcd.) and 16.00% P (16.38% calcd.).

*Example 4*

The o-tolidine salt of phosphoramidic acid was prepared by metathesis of disodium phosphoramidate with o-tolidine acetate in aqueous solution.

To a solution of 1.5 g. o-tolidine in 100 ml. water and 50 ml. glacial acetic acid was added a solution of 1.25 g. disodium phosphoramidate hexahydrate in 140 ml. water. On adding 60 ml. t-butanol and cooling the mixture to 5° C., the product crystallized as hexagonal platelets. The precipitated solids were washed with alcohol and ether, and weighed 0.9 g. Analysis showed the compound to be $(C_{14}H_{16}N_2)(H_2O_2PONH_2)_2 \cdot H_2O$ having the elementary analysis of 13.32% N (13.20% calcd.) and 14.47% P (14.60% calcd.).

*Example 5*

Tetrasodium imidodiphosphate, was prepared by gently heating 25 grams disodium phosphoramidate hexahydrate which was thus first dehyrated under reduced pressure, at about 25–35° C. after which the temperature was raised stepwise to 110° C. On raising the temperature further, with continued pumping, ammonia was removed. The speed and extent of the reaction is dependent upon the temperature and the pressure, but at 210° C. and less than 1 mm. pressure was complete in several days. The crude product was fractionally crystallized by dissolving in water and adding acetone in small portions. The first fraction of precipitated solids (about 25% of the total) was discarded, and that which precipitated on further addition of acetone was used. The product had the formula:

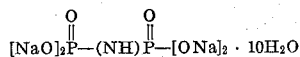

corresponding to tetrasodium imidodiphosphate decahydrate.

*Example 6*

The n-octylamine salt of imidodiphosphoric acid was prepared as follows. To a solution of 4 grams of tetrasodium imidodiphosphate decahydrate in 30 ml. cold water was added 60 grams of an ion exchange resin, IR–120, in the acid form. The suspension was stirred, while chilling in an ice bath, for 10 minutes and the resin was then removed by filtration. To the water solution of imidodiphosphoric acid thus formed was then added 5 grams of n-octylamine whereupon a waxy solid separated. This was removed and dissolved in warm t-butanol. On adding acetone and chilling, the product crystallized and was recovered by filtration followed by washing with ether.

*Example 7*

The benzidine salt of imidodiphosphoric acid was prepared as follows. To a solution of 1.84 g. of benzidine in 122 ml. water and 61 ml. of glacial acetic acid was slowly added a solution of 1.64 g. of the tetrasodium imidodiphosphate decahydrate in 190 ml. water. After stirring for an hour, the crystalline precipitate was filtered off and washed with alcohol and ether.

*Example 8*

Sodium phosphorodiamidate was prepared from the phenyl phosphorodiamidate of Example 1 by treating 25 grams thereof with 12 grams of sodium hydroxide dissolved in 55 ml. of water, and gently boiling for a period of 10 minutes. The reaction mixture was cooled to about 5° C. and 200 ml. of ethanol added. The solid product consisting of crude sodium phosphorodiamidate

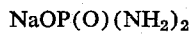

in the form of a hydrate was filtered off and washed with alcohol and ether.

*Example 9*

Trisodium diamido diimidotriphosphate,

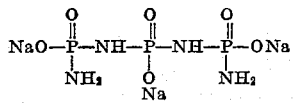

was prepared as follows. Sodium phosphorodiamidate, $NaOPO(NH_2)_2$, was first dehydrated under vacuum, at 25–110° C. raising the temperature gradually. On raising the temperature above 110° C. ammonia was evolved, particularly rapidly at 160° C. After several hours the white solids were cooled and found to be crude trisodium diamido diimidotriphosphate.

Example 10

The benzidine salt of diamido diimidotriphosphoric acid was prepared as follows. To a solution of 1.84 g. of benzidine in 122 ml. water and 61 ml. of acetic acid was slowly added a solution of 1.00 g. of the trisodium diamido diimidotriphosphate in 100 ml. water. After stirring for an hour the crystalline precipitate was filtered off and washed with alcohol and ether.

Example 11

Trisodium dihydrogen diimidotriphosphate,

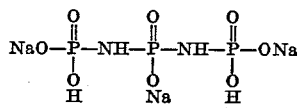

was prepared as follows. A water solution of trisodium diamido diimidotriphosphate was acidified with acetic acid and treated with nitrogen sesquioxide, $N_2O_3$, to convert amido groups to acidic hydroxyl groups. When the reaction was terminated, as shown by cessation in the release of nitrogen gas, excess $N_2O_3$ was removed by evacuation. Water and acetic acid were also removed by distillation under reduced pressure to leave a residue consisting essentially of trisodium dihydrogen diimidotriphosphate.

Example 12

The benzidine salt of diimidotriphosphoric acid was prepared as follows. To a solution of 1.84 g. of benzidine in 122 ml. water and 61 ml. of acetic acid was slowly added a solution of 1.00 g. of the trisodium dihydrogen diimidotriphosphate in 100 ml. water. After stirring for an hour the crystalline precipitate was filtered off and washed with alcohol and ether.

Example 13

The utility of the o-tolidine salt of phosphoramidic acid as a corrosion inhibitor was demonstrated by preparing a series of suspensions respectively containing: I, 2%; II, 0.5%; III, 0.1% by weight of the o-tolidine salt of phosphoramidic acid. Another solution, IV, containing only water was employed as a control in the tests. The four solutions were placed in test tubes into which small polished samples of mild steel were placed. It was observed that at the end of 24 hours the three solutions, I, II and III, containing the amine salt of phosphoramidic acid exhibited substantially no rusting of the steel, while the control solution, IV, indicated substantial rusting of the specimen.

In general, it has been found that aqueous or organic solutions or dispersions containing from 0.01% to 5% by weight of the amine salt are useful for corrosion inhibition.

What is claimed is:

1. An amine salt having the formula [X] [Y], where X is an amine moiety selected from the class consisting of ethylenediamine, n-octylamine, m-phenylenediamine, p-phenylenediamine, naphthidene, β-naphthylamine, 4,4'-diaminotolane, benzidine, o-tolidine, o-dianisidine, monoalkylbenzidine and dialkylbenzidine, and Y is selected from the class consisting of phosphoramidic acid, imidodiphosphoric acid and diimidotriphosphoric acid.
2. Benzidine phosphoramidate.
3. Orthotolidine phosphoramidate.
4. n-Octylamine imidodiphosphate.
5. Benzidine imidodiphosphate.
6. Benzidine diamido diimidotriphosphate.
7. Benzidine diimidotriphosphate.

References Cited in the file of this patent

UNITED STATES PATENTS

| | | |
|---|---|---|
| 2,755,166 | Marsh | July 17, 1956 |
| 2,757,066 | Gardner | July 31, 1956 |
| 2,776,311 | Erbel et al. | Jan. 1, 1957 |
| 2,786,075 | Krase et al. | Mar. 19, 1957 |

OTHER REFERENCES

Kosolapoff: Organo-Phosphorus Compounds, John Wiley, New York (1950), pp. 283–285; 288; 295–297; 319.